United States Patent
Tagawa et al.

(10) Patent No.: US 9,790,799 B2
(45) Date of Patent: Oct. 17, 2017

(54) GAS TURBINE AIRFOIL

(71) Applicant: Mitsubishi Hitachi Power Systems, Ltd., Yokohama, Kanagawa (JP)

(72) Inventors: Hisato Tagawa, Yokohama (JP); Yasuhiro Horiuchi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 346 days.

(21) Appl. No.: 14/532,132

(22) Filed: Nov. 4, 2014

(65) Prior Publication Data

US 2015/0125310 A1    May 7, 2015

(30) Foreign Application Priority Data

Nov. 6, 2013 (JP) ................... 2013-230201

(51) Int. Cl.
| | | |
|---|---|---|
| *F01D 5/08* | (2006.01) | |
| *F01D 5/18* | (2006.01) | |
| *F01D 9/04* | (2006.01) | |
| *F01D 9/06* | (2006.01) | |
| *F01D 11/04* | (2006.01) | |
| *F01D 25/12* | (2006.01) | |

(52) U.S. Cl.
CPC ............... *F01D 5/18* (2013.01); *F01D 5/082* (2013.01); *F01D 9/041* (2013.01); *F01D 9/065* (2013.01); *F01D 11/04* (2013.01); *F01D 25/12* (2013.01); *F05D 2240/81* (2013.01); *F05D 2260/20* (2013.01); *F05D 2260/202* (2013.01)

(58) Field of Classification Search
CPC ........ F01D 11/001; F01D 11/04; F01D 25/12; F01D 9/065; F05D 2260/202
See application file for complete search history.

(56) References Cited

U.S. PATENT DOCUMENTS

| | | | |
|---|---|---|---|
| 6,082,961 A | 7/2000 | Anderson et al. | |
| 7,004,721 B2 * | 2/2006 | Imbourg | F01D 5/187 |
| | | | 415/115 |

(Continued)

FOREIGN PATENT DOCUMENTS

| | | |
|---|---|---|
| DE | 198 13 779 A1 | 9/1999 |
| EP | 0 902 164 A1 | 3/1999 |

(Continued)

OTHER PUBLICATIONS

Extended European Search Report dated Apr. 9, 2015 (ten (10) pages).

*Primary Examiner* — Woody Lee, Jr.
*Assistant Examiner* — Sabbir Hasan
(74) *Attorney, Agent, or Firm* — Crowell & Moring LLP (57) ABSTRACT

A gas turbine airfoil is provided that is superior in the cooling performance of an end wall and in the thermal efficiency of a gas turbine. A gas turbine airfoil includes an airfoil portion having a cooling passage therein; and an end wall portion located at an inner band end portion of the airfoil portion in the turbine-radial direction. Cooling holes are disposed in the leading edge side hook portion of the end wall portion. The plurality of cooling holes are arranged at different distance of intervals in the circumferential direction of the gas turbine. Cooling air that has flowed in the cooling passage is configured to flow from the cooling holes toward the leading edge of the end wall portion.

8 Claims, 4 Drawing Sheets

(56) References Cited

U.S. PATENT DOCUMENTS

| | | |
|---|---|---|
| 8,118,554 B1 | 2/2012 | Liang |
| 8,221,055 B1 | 7/2012 | Liang |
| 8,573,938 B1 | 11/2013 | Liang |
| 8,783,044 B2 * | 7/2014 | Steiger .................... F01D 5/186 415/115 |
| 9,017,013 B2 * | 4/2015 | Laurello ............... F01D 11/001 415/115 |
| 2004/0161336 A1 | 8/2004 | Imbourg et al. |
| 2006/0078417 A1 | 4/2006 | Benton |
| 2010/0313571 A1 | 12/2010 | Steiger et al. |

FOREIGN PATENT DOCUMENTS

| | | |
|---|---|---|
| EP | 1 452 691 A1 | 9/2004 |
| EP | 1 607 580 A2 | 12/2005 |
| EP | 1 895 104 A2 | 3/2008 |
| EP | 1 985 806 A1 | 10/2008 |
| JP | 5-10102 A | 1/1993 |
| JP | 10-184312 A | 7/1998 |
| JP | 11-200807 A | 7/1999 |
| JP | 2012-132461 A | 7/2012 |
| WO | WO 2009/083456 A3 | 7/2009 |

\* cited by examiner

GAS TURBINE AIRFOIL

BACKGROUND OF THE INVENTION

1. Field of the Invention

The present invention relates to a gas turbine airfoil used for a gas turbine.

2. Description of the Related Art

A gas turbine airfoil is exposed on its surface to high-temperature combustion gas. Therefore, the gas turbine airfoil needs to be forcibly cooled in order to inhibit degradation of an airfoil material under a high-temperature condition or lowering of structural strength to ensure its soundness. In recent years, combustion temperature has been increasing to improve the thermal efficiency of a gas turbine. Accordingly, it has been required to forcibly cool also an inner band end wall of a second stage nozzle that has heretofore not been cooled.

One of the documents relating to the present technical field is JP-1993-10102-A. This document describes the fact that "the cooling medium that has cooled the airfoil body (20a) is discharged into a gas path flow. What is important is that the exhaust port (25) of cooling air is provided at a position on the airfoil-leading edge side of the inner band end wall (20b)". The document further says that "the discharge port (25) is provided at such a position that cooling air is discharged into the cavity (28) defined in cooperation with the bucket (1) located on the upstream side of the nozzle (20)".

JP-1998-184312-A describes that "the inner band end wall (4b) has the air passage (8) which extends in the circumferential direction and is made to be connected to the inner cooling passage (7) of the nozzle (2b). A jetting port (9) of the air passage (8) is located on the main stream side with respect to the tip of the seal fin (16a) so as to open like a slit." It is further described that "cooling air is partially passed through the air passage (8) disposed in the inner band end wall (4b) and is continuously jetted from the slit-like jetting port (9) toward the seal fin (16a) of the second stage bucket body (11b) in a circumferential direction. The jetting cooling air is jetted to the sealing device in which the inner band end wall (4b) and the tip of the seal fin (16a) cooperate with each other. At the same time, the jetted cooling air dilutes the gas path flow leaking into the stage gap (25) to lower the temperature in the vicinity of the sealing device". Incidentally, the symbols shown in the parentheses in the above denote referential numerals and are independent of the referential numerals of the present specification to be described later.

SUMMARY OF THE INVENTION

Gas turbines are such that a compressor located coaxially with a turbine sucks air, compresses the air, and delivers the compressed air to a combustor, in which the compressed air is mixed with fuel for combustion. Meanwhile, the compressed air that is partially extracted from the compressor is used as air for cooling turbine airfoils. To improve the thermal efficiency of the gas turbine, therefore, it is necessary to reduce the air for cooling the turbine airfoils as much as possible with cooling performance maintained and to use the compressed air for combustion.

In regard to this point, JP-1993-10102-A does not refer to how the cooling air discharge ports disposed on the airfoil-leading edge side of the inner band end wall are arranged in the circumferential direction of the turbine in view of cooling the end wall. Meanwhile, the air passage disposed in the inner band end wall in JP-1998-184312-A is used to cool the vicinity of the sealing device disposed in the stage-gap. Similarly to the previous document, JP-1998-184312-A does not refer to how the air passage should be disposed in the circumferential direction of the turbine in view of cooling the end wall.

It is an object of the present invention to provide a gas turbine airfoil superior in the cooling performance of an end wall and in the thermal efficiency of a gas turbine.

According to one aspect of the present invention, there is provided a gas turbine airfoil including: an airfoil portion having a cooling passage therein; an end portion wall located on an end portion of one side of the airfoil portion in an radial direction of a turbine; a leading edge side hook portion located on a leading edge side of the airfoil portion, the leading edge side hook portion being adapted to allow the end wall portion to be engaged with a diaphragm adjacent to the end wall portion; and a plurality of cooling holes disposed in the leading edge side hook portion so as to be connected to the cooling passage; wherein the plurality of cooling holes are arranged in a circumferential direction of the turbine and some of the cooling holes adjacent to each other in the circumferential direction of the turbine have a different distance of interval therebetween.

The present invention can appropriately distribute cooling air in the circumferential direction of the turbine in accordance with the necessity of cooling strengthening for each portion of the end wall. Thus, the present invention can inhibit the used amount of cooling air to improve the thermal efficiency of the gas turbine.

DESCRIPTION OF THE PREFERRED EMBODIMENTS

Before the description of embodiments of the present invention, a description is first given of main features of a gas turbine airfoil according to each of the embodiments of the present invention.

(1) A gas turbine airfoil according to an embodiment of the present invention described later includes: an airfoil portion having a cooling passage in its inside; an end wall portion located on an end portion of one side of the airfoil portion in an radial direction of a turbine; a leading edge side hook portion (an upstream side hook portion) located on a leading edge side of the airfoil portion, the leading edge side hook portion being adapted to allow the end wall portion to be engaged with a diaphragm adjacent to the end wall portion; and a plurality of cooling holes disposed in the leading edge side hook portion so as to be connected to the cooling passage. The plurality of cooling holes are arranged in a circumferential direction of the turbine and some of the cooling holes adjacent to each other in the circumferential direction of the turbine have a different length of interval therebetween.

In the case where the cooling hole arrangement method described above is employed, for example, the cooling holes may be concentrated at a portion subjected to relatively higher temperatures than the other portions in the circumferential direction of the turbine. In such a case, the portion where the cooling holes are densely arranged can preferentially be cooled due to convection cooling resulting from cooling air passing through the inside of the cooling holes and to the increased flow rate and reduced temperature of the sealing air resulting from the cooling air discharged from the cooling holes. The amount of the cooling air discharged from the cooling holes can be reduced compared with the case where the cooling holes are arranged at equally spaced intervals in the circumferential direction of the turbine. In other words, the total amount of the cooling air discharged from the cooling holes can be reduced more than the case where the cooling holes are arranged equally in the circumferential direction of the turbine. An amount of extracted compressed air thereby can be smaller. Thus, a decrease in gas turbine efficiency can be controlled.

(2) A temperature distribution of the end wall portion in the circumferential direction of the turbine depends on the flow rate of the sealing air that flows out from a clearance (a gap) between a bucket and a nozzle adjacent thereto and then flows along the gas path-side surface of the end wall portion of the nozzle. Therefore, the plurality of cooling holes located in an area (e.g., an area 720 in FIG. 4 described later) where the flow rate of the sealing air flowing on the airfoil side surface (a gas path side surface) in the surface of the end wall portion is relatively low is preferably placed at narrower intervals than that located in an area (e.g., an area 710 in FIG. 4 described later) where the flow rate is relatively high. When the cooling holes are arranged as described above, the area of the high-temperature portion where the flow rate of the sealing air is relatively low can be cooled in a high priority. Consequently, the gas turbine efficiency can be controlled from being lower.

(3) Incidentally, "the area where the flow rate of the sealing air in the end wall portion is relatively low" in the above item (2) is an area including a first portion of the end wall portion close to the leading of the airfoil portion; and a second portion stretching from the first portion to a third portion near the pressure surface of the airfoil portion (e.g., an area from P1 to Pm in FIG. 1 described later, and an area from P1 to Pm may be added to such an area). In this way, the arrangement intervals of the plurality of cooling holes located at such an area are made denser than the other areas (e.g., the area close to the suction side area of the airfoil). Thus, the lowering of the gas turbine efficiency can effectively be controlled.

The plurality of cooling holes are available in various shapes. For example, the shape of the cooling hole is as below. In the state where the end wall portion is secured to the diaphragm via the leading edge side hook portion, the cooling hole has: an inlet portion opening on a surface facing toward the cooling passage and included in the leading edge side hook portion; an outlet portion opening on a surface facing toward the diaphragm and included in the leading edge side hook portion; and an intermediate portion which is a hole allowing the inlet portion and the outlet portion to be connected to each other in the leading edge side hook portion and extending from the inlet portion to the outlet portion toward the leading edge. For example, this hole corresponds to a cooling hole 130 in a first embodiment described later.

In the cooling hole formed as described above, cooling air which enters the inside of the cooling hole from the cooling passage via the inlet portion first cools the end wall portion. Thereafter, the cooling air is discharged to the outside of the leading edge side hook portion via the outlet portion. While passing through a gap defined between the diaphragm and the end wall portion, the cooling air thus discharged further cools the end wall portion before it will reach the gap between the bucket and the nozzle. The cooling air that has reached such a gap is discharged into the gas path along with the sealing air.

(5) In the case of the provision of the cooling hole as in the above item (4), grooves may further be disposed on a surface from which the leading edge side hook projects in the surface of the end wall portion, the groove allowing the outlet of the cooling hole and the leading edge of the end wall portion to be connected to each other. For example, such grooves correspond to grooves 135 in a second embodiment described later. The grooves are disposed in "the gap defined between the diaphragm and the end wall portion". Even if the gap is minute, therefore, the presence of the grooves makes it easy for the cooling air to pass through the gap, thereby improving cooling performance.

(6) The cooling hole may have another shape as below. In the state where the end wall is secured to the diaphragm via the leading edge side hook portion, the cooling hole has: an inlet portion opening on a surface facing toward the cooling passage and included in the leading edge side hook portion or the end wall portion; an outlet portion opening on a leading edge side surface (namely, a portion located on the upstream side of the end wall portion in the flow direction of combustion gas) of the end wall portion; and an intermediate portion which is a hole allowing the inlet portion and the outlet portion to be connected to each other, the portion extending from the inlet portion to the outlet portion toward the leading edge side. For example, such a cooling hole corresponds to a cooling hole 131 in a third embodiment described later.

The cooling hole formed as described above is also adapted to allow the cooling air introduced into the cooling hole via the inlet portion to cool the end wall portion. The cooling air that has cooled the end wall portion is discharged to the vicinity of the gap via the outlet portion at the leading edge. Similarly to the previous case, the cooling air is discharged to the gas path along with the sealing air. Thus, even when the cooling hole is formed as described above, the end wall portion can be still cooled.

Preferred embodiments of the present invention will specifically be described below with reference to the figures. Taking a second stage nozzle 300 of a gas turbine as an example, a description is given of a cooling structure of an inner band end wall portion 100 located on the inside, in the circumferential direction of the turbine, of an airfoil portion 310 of the second stage nozzle 300.

First Embodiment

Figure 1:
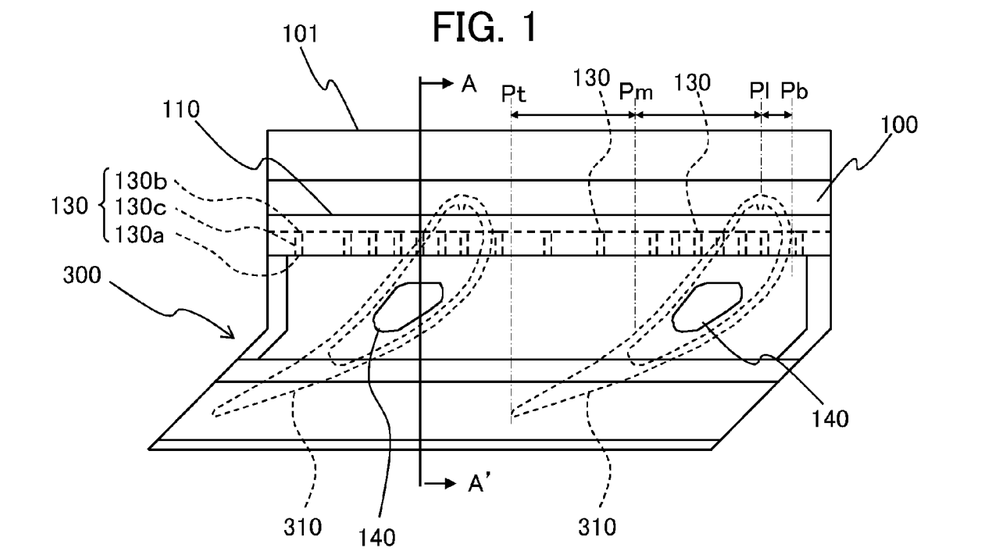
FIG. 1 is a top view of an inner band end wall portion 100 of a gas turbine airfoil 300 according to a first embodiment of the present invention by way of example.
Figure 2:
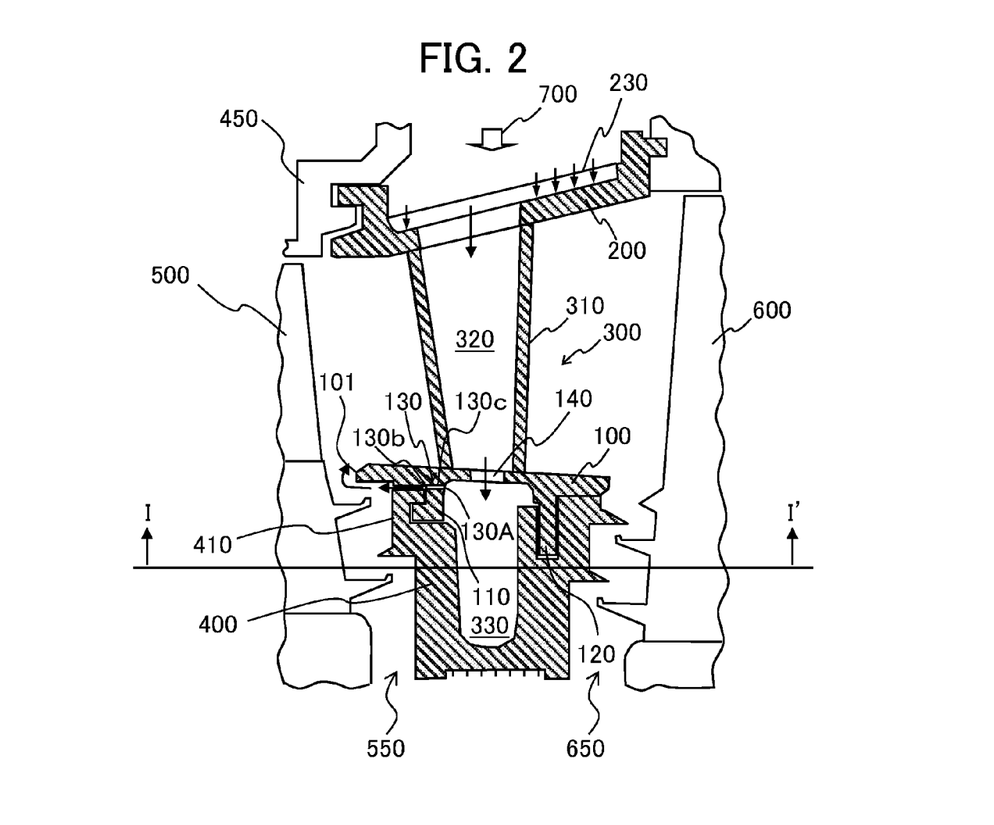
FIG. 2 is a cross-sectional view of the gas turbine airfoil illustrated in FIG. 1 taken along plane A-A' in FIG. 1.

FIG. 1 is a top view of one example of the inner band end wall portion 100 of a gas turbine airfoil (the nozzle) 300 according to a first embodiment of the present invention. FIG. 1 illustrates the inner circumferential end wall portion 100 as viewed from the inside to the outside in the radial direction of a turbine (see arrows I and I" in FIG. 2). The nozzle (the second stage nozzle) 300 of the present embodiment is a double-airfoil having two airfoil portions 310 arranged for the single end wall portion 100. FIG. 1 illustrates the arrangement of a plurality of cooling holes 130 formed in a hook portion 110 by way of an example. Among the plurality of cooling holes 130, some cooling holes 130 adjacent circumferentially to each other have different distance of intervals therebetween. FIG. 2 is a cross-sectional view of the gas turbine airfoil illustrated in FIG. 1 taken along plane A-A' in FIG. 1. A description is below given of a reason for adopting the arrangement of the cooling holes 130 illustrated in FIG. 1.

Figure 3:
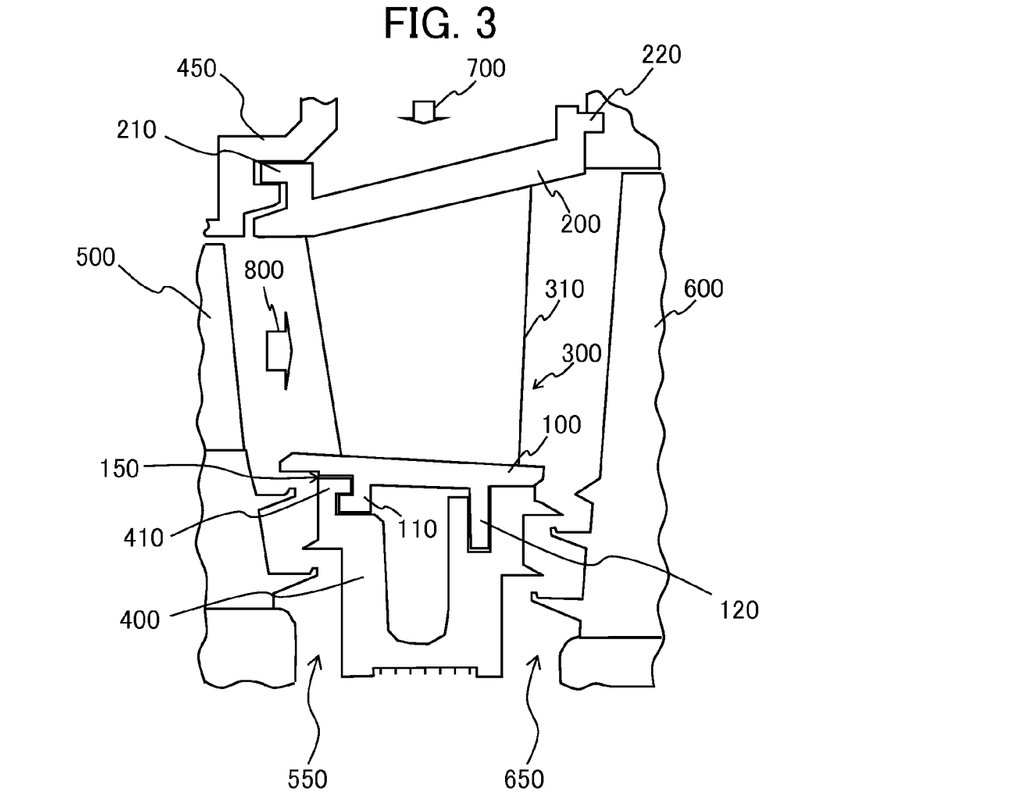
FIG. 3 is a side view of the gas turbine airfoil 300 illustrated in FIG. 1.

FIG. 3 is a side view of the gas turbine airfoil 300 illustrated in FIG. 1. With reference to FIG. 3, the gas turbine airfoil (the second stage nozzle) 300 according to the present embodiment includes the airfoil portion 310, an outer band end wall portion 200, an upstream-side hook portion 210, a downstream-side hook portion 220, the inner band end wall portion 100, the upstream-side hook portion 110 and the downstream-side hook portion 120.

As illustrated in FIG. 3, the second stage nozzle 300 according to the present embodiment is located between a first stage bucket 500 lying on the upstream side of the flow of combustion gas 800 and a second stage bucket 600 lying on the downstream side thereof. The combustion gas 800 flowing from the first stage bucket 500 is accelerated by the airfoil portion 310 of the second stage nozzle 300 so that the second stage bucket 600 can take out power efficiently. Then, the direction of the flow of the combustion gas 800 is deflected. The inner band end wall portion 100 is provided at the inner circumferential (turbine-radial inside) end portion of the second stage nozzle 300. The outer band end wall portion 200 is provided at an outer circumferential (turbine-radial outside) end portion thereof. These two end wall portions 100, 200 constitute part of a gas path of a gas turbine; therefore, they are exposed to the high-temperature combustion gas.

The upstream-side hook portion (hook on the leading edge side) 210 and the downstream-side hook portion (hook on the trailing edge side) 220 are provided on a surface (an outer circumferential surface) of the outer band end wall portion 200 located on the turbine-radial outside so as to secure the outer band end wall portion 200 to a diaphragm outer ring (an outer diaphragm) 450.

The upstream-side hook portion 210 projects from the outer circumferential surface of the end wall portion 200 toward the turbine-radial outside. In addition, the upstream-side hook portion 210 has such a hook shape as to have a leading end that is bent at a roughly right angle toward the upstream side in the flow direction (the gas flow direction) of combustion gas. Meanwhile, the downstream-side hook portion 220 projects from the outer circumferential surface of the end wall portion 200 toward the turbine-radial outside. In addition, the downstream-side hook portion 220 has such a hook shape as to have a leading end that is bent at a roughly right angle toward the downstream side in the flow direction (the gas flow direction) of combustion gas. The two hook portions 210, 220 are engaged with concave portions disposed in the diaphragm outer ring 450 through the projecting hook shapes. The two hook portions 210, 220 secure the turbine-radial outside of the second state nozzle 300 to a casing (the outer diaphragm 400) serving as a stationary body.

Meanwhile, the upstream-side hook portion (hook on the leading edge side) 110 and the downstream-side hook portion (trailing edge side hook) 120 are provided on a surface (an inner circumferential surface) of the inner band end wall portion 100 located on the turbine-radial inside so as to secure the inner band end wall portion 100 to the diaphragm inner ring (the inner diaphragm) 400.

The upstream-side hook portion 110 projects from the inner circumferential surface of the end wall portion 100 toward the turbine-radial inside. In addition, the upstream-side hook portion 110 has such a hook shape as to have a leading end that is bent at a roughly right angle toward the upstream side in the gas flow direction. Meanwhile, the downstream-side hook portion 120 projects from the inner circumferential surface of the end wall portion 100 toward the turbine-radial inside. However, the leading end of the downstream-side hook portion 120 is not bent unlike the upstream-side hook portion 110. Alternatively, similarly to the upstream-side hook portion 110, the leading end of the downstream-side hook portion 120 may be bent too. The diaphragm inner ring (the inner diaphragm) 400 has a hook portion 410 as a part with which the upstream-side hook portion 110 is engaged. The hook portion 410 is a part that projects from the outer circumference of the diaphragm 400 toward the turbine-radial outside. In addition, the hook portion 410 has such a hook shape as to have a leading end that is bent at a roughly right angle toward the downstream side in the gas flow direction. The two hook portions 110, 120 formed as described above have concave shapes, which are engaged with concave portions including the hook portion 410 disposed in the diaphragm inner ring 400. The two hook portions 110, 120 secure the turbine-radial inside of the second stage nozzle 300 to the diaphragm 400 as a stationary body.

As illustrated in FIG. 2, cooling air 700 is extracted from a compressor (not shown) mounted in gas turbine equipment, is supplied from the turbine-radial outside of the airfoil portion 310, and flows into a cooling passage 320 formed inside the airfoil portion 310 of the second stage nozzle 300. Thereafter, while the cooling air 700 passes through the cooling passage 320 inside the airfoil portion 310 and is partially discharged into the gas path, the remaining cooling air flows toward a cooling passage 330 on the side of the diaphragm 400 via an opening portion 140 disposed in the inner band end wall portion 100.

Incidentally, the cooling passage 320 illustrated in FIG. 2 is formed as a linear passage extending in the turbine-radial direction. However, the present invention is not limited to this. The known shapes including a passage shape that extends in a zigzag manner in the turbine-radial direction in the airfoil 310 are available. Although a description is here not given with illustration, the cooling air thereafter flows out from a flow control hole bored in the diaphragm 400 into a wheel space to cool the wheel space. Then the cooling air flows into the gas path from a gap 550 defined in cooperation with the first stage bucket 500 on the upstream side and a gap 650 defined in cooperation with the second stage bucket 600. In this way, the cooling air functions as sealing air adapted to prevent the inflow of combustion gas into the wheel space.

In the example illustrated in FIG. 2, an impingement plate 230 provided with a plurality of impingement holes (not shown), which are fine pores, are installed on the turbine-radial outside of the outer band end wall portion 200. The example is configured such that the outer band end wall portion 200 is impingement-cooled by the cooling air jetted from the impingement holes toward the outer circumferential surface of the outer band end wall portion 200.

Figure 4:
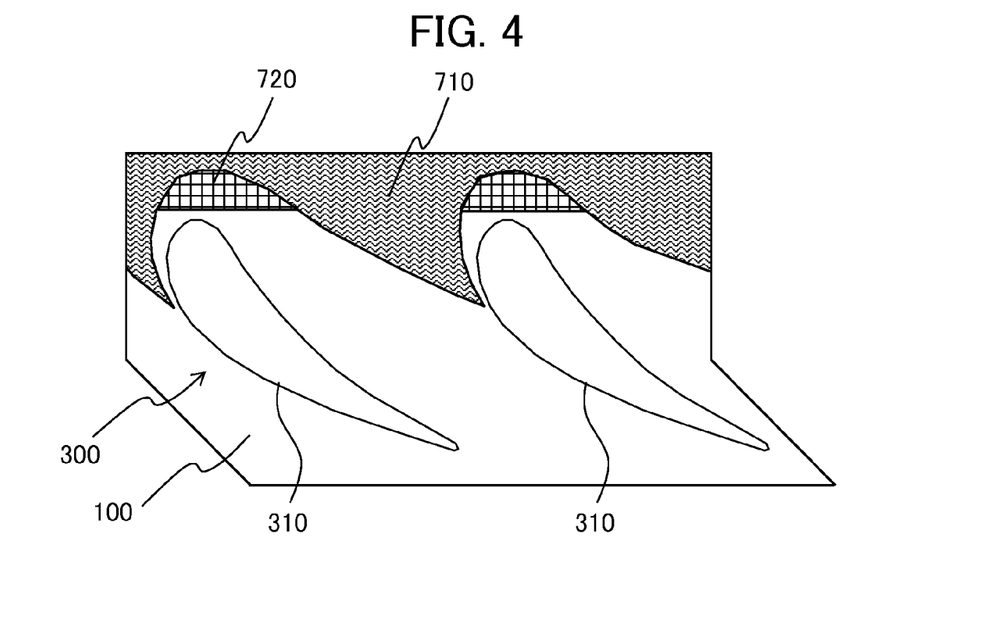
FIG. 4 illustrates a state where sealing air flows on the outer circumferential surface of the inner band end wall portion of the gas turbine airfoil.

FIG. 4 illustrates the surface (the outer circumferential surface) of the inner band end wall portion 100 encountered when the inner band end wall portion 100 is viewed from the outside to the inside in the turbine-radial direction. In addition, FIG. 4 illustrates the front surface on which experimental results are superimposed, the experimental results being obtained from the observation of the flowing state of the sealing air 710 flowing out from the gap 550 defined in cooperation with the first stage bucket 500. As illustrated in this figure, the sealing air 710 flows on the outer circumferential surface of the inner band end wall portion 100 in a biased distribution. The flow rate of the sealing air 710 is relatively low in areas including a portion near the leading edge of each airfoil portion 310 and this portion to another portion near the pressure surface of each airfoil portion 310. Such areas are a part of an area 720 exposed to high-temperature combustion gas; therefore, those areas have a low cooling effect of the sealing air 710. With that in mind, the inventors found that it is effective to intensively increase the cooling of the area 720 exposed to high-temperature combustion gas in order to ensure the material soundness of the inner band end wall portion 100 and to reduce the amount of cooling air introduced into the cooling passage 320. Moreover, the inventors intended to increase the cooling of the area 720 by narrowing the spacing between the plurality of cooling holes 130 located in the area 720 and another area adjacent thereto more than those located in the other areas, the cooling holes 130 being used to cool the inner band end wall portion 100.

With reference back to FIG. 1, the upstream-side hook portion 110 is provided with the plurality of cooling holes 130 located at predetermined intervals in the circumferential direction of the turbine. The cooling holes 130 are made to communicate with the cooling passage 320 in the airfoil portion 310. All the intervals of the cooling holes 130 arranged in the circumferential direction of the turbine are not the same; that is, some of the intervals thereof are different from each other. Specifically, the cooling holes 130 are arranged such that their intervals in an area corresponding to the area 720 in FIG. 4 are more narrowed than those in the other areas.

The area where the intervals of the cooling holes 130 arranged in the circumferential direction of the turbine are narrowed needs only to be determined on the basis of the distribution of sealing air shown in FIG. 4. To get a rough idea, a method of determining such an area is as below. In the present embodiment as shown in FIG. 1, it is assumed that a position of the leading edge of the airfoil in the circumferential direction of the turbine is point P1, the position of the trailing edge of the airfoil is point Pt, the center (the middle point) between point P1 and point Pt is point Pm, and a point at which a plane including the central axis of the turbine is in contact with the suction side of the airfoil portion 310 is point Pb. In this case, the arrangement intervals of the cooling holes 130 included in an area from point P1 to point Pm are configured to be narrower than those of the other areas. Arrangement intervals may be narrowed also in an area from point P1 to point Pb in addition to the area from point P1 to point Pm.

As illustrated in FIGS. 1 and 2, each of the cooling holes 130 includes an inlet portion 130a, an outlet portion 130b, and an intermediate portion 130c connecting the inlet portion 130a and the outlet portion 130b. The inlet portion 130a is open on a surface, facing toward the cooling passage 330, in the surface of the upstream-side hook portion 110 in the state where the inner band end wall portion 100 is secured to the diaphragm inner ring 400 via the hook portions 110, 120. The inlet portion 130a in FIG. 2 is provided at a base (a root portion) of the upstream-side hook portion 110 toward the inner band end wall portion 100. The outlet portion 130b is open on a surface, facing toward the hook shape of the hook portion 410 of the diaphragm 400, in the surface of the upstream-side hook portion 110 in the state where the inner band end wall portion 100 is secured to the diaphragm inner ring 400 via the hook portions 110, 120. The intermediate portion 130c is a hole that connects the inlet portion 130a and the outlet portion 130b in the upstream-side hook portion 110. In addition, the intermediate portion 130c extends from the inlet portion 130a to the outlet portion 130b toward the trailing edge 101.

In the second stage nozzle configured as described above, as illustrated in FIG. 2, the cooling air 700 extracted from the compressor is supplied from the turbine-radial outside of the airfoil portion 310 to the second stage nozzle 300. The cooling air 700 is first jetted from the impingement holes on the impingement plate 230 to cool the outer band end wall portion 200. The cooling air passes through the cooling passage 320 inside the airfoil portion 310 to cool the airfoil portion 310. Thereafter, the cooling air is partially discharged into the gas path. Meanwhile, the remaining cooling air that has not been discharged into the gas path flows into the cooling passage 330 on the side of the diaphragm 400 from the cooling passage 330 via the opening portion 140. Due to a pressure difference between the inside and outside of the diaphragm 400, the cooling air enters the cooling holes 130 from the inlet portions 130a bored in the surface of the upstream-side hook portion 110, passing through the cooling holes 130, and is discharged from the outlet portion 130b. The cooling air discharged from the outlet portions 130b enters a gap 150 (see FIG. 3) defined between the inner circumferential surface of the inner band end wall portion 100 and the outer circumferential surface of the outer band hook portion 410. Then, the cooling air thus discharged moves in the gap 150 toward the trailing edge 101 (see FIGS. 1 and 2) of the inner band end wall portion 100 and is discharged together with sealing air into the gap 550 defined in cooperation with the first stage bucket 500.

As described above, the cooling air passing through the cooling holes 130 and the gap 150 convectionally cools the inner band end wall portion 100. In particular, in the area 720 where the flow rate of sealing air is low, the arrangement intervals of the cooling holes 130 are made denser than in the other areas as illustrated in FIG. 4. Therefore, the convection cooling capability in the area 720 is strengthened and, at the same time, the enhanced cooling capability resulting from the increased flow rate and lowered temperature of the sealing air is achieved. Thus, the effective cooling is realized.

As described above, if the intervals of the cooling holes 130 arranged in the circumferential direction of the turbine are changed, the cooling air can appropriately be distributed in the circumferential direction of the turbine in accordance with the necessity of the cooling strengthening at the portions of the inner band end wall portion 100. Specifically, the cooling holes 130 are densely arranged in the area where the flow rate of the sealing air is relatively low (where the necessity of cooling strengthening is high) so as to make it possible to distribute the increased cooling air. Meanwhile, the cooling holes 130 are sparsely arranged in the area where the flow rate of the sealing air is relatively high (where the necessity of the cooling strengthening is low) so as to make it possible to distribute the reduced cooling air. For example, if it is assumed that the total amount of cooling air and the total number of the cooling holes 130 are constant, therefore, in the present embodiment, the total amount of cooling air can be reduced compared with the case where the arrangement intervals of the cooling holes 130 are the same. In this way, the amount of compressed air extracted from the compressor can be smaller; therefore, the thermal efficiency of the gas turbine can eventually be improved.

In the above embodiment, the intervals of the cooling holes 130 arranged in the circumferential direction of the turbine have only the two types; however, the arrangement intervals of three or more types maybe available depending on the distribution of the flow rate of sealing air.

Second Embodiment

In a second embodiment, in addition to the cooling holes 130 of the hook portion 110 described in the first embodiment, groove 135 communicating with the corresponding cooling holes 130 are disposed in the inner circumferential surface of an inner band end wall portion 100. In this way, the cooling holes 130 and the grooves 135 are combined to increase the amount of cooling air, thereby strengthening the cooling performance.

Figure 5:
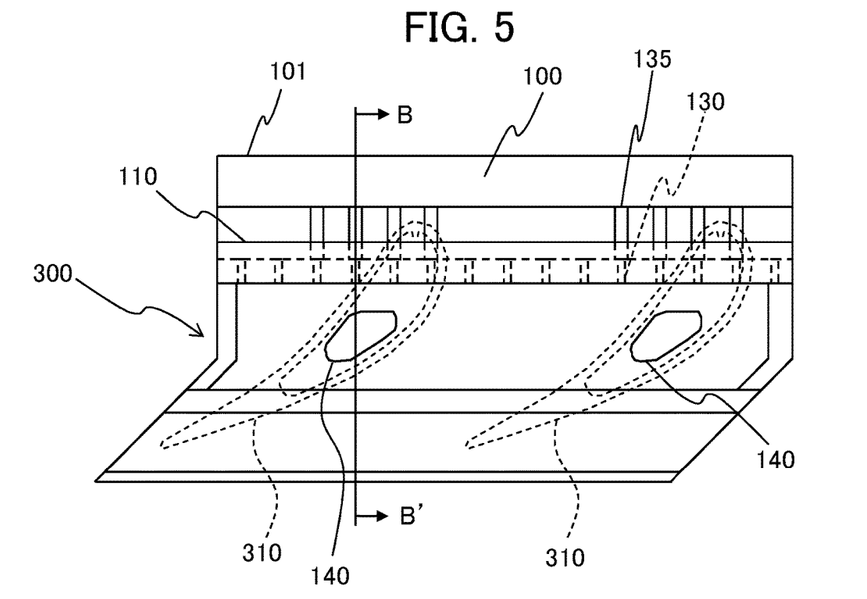
FIG. 5 is a top view of an inner band end wall portion of a gas turbine airfoil 300 according to a second embodiment of the present invention by way of example.
Figure 6:
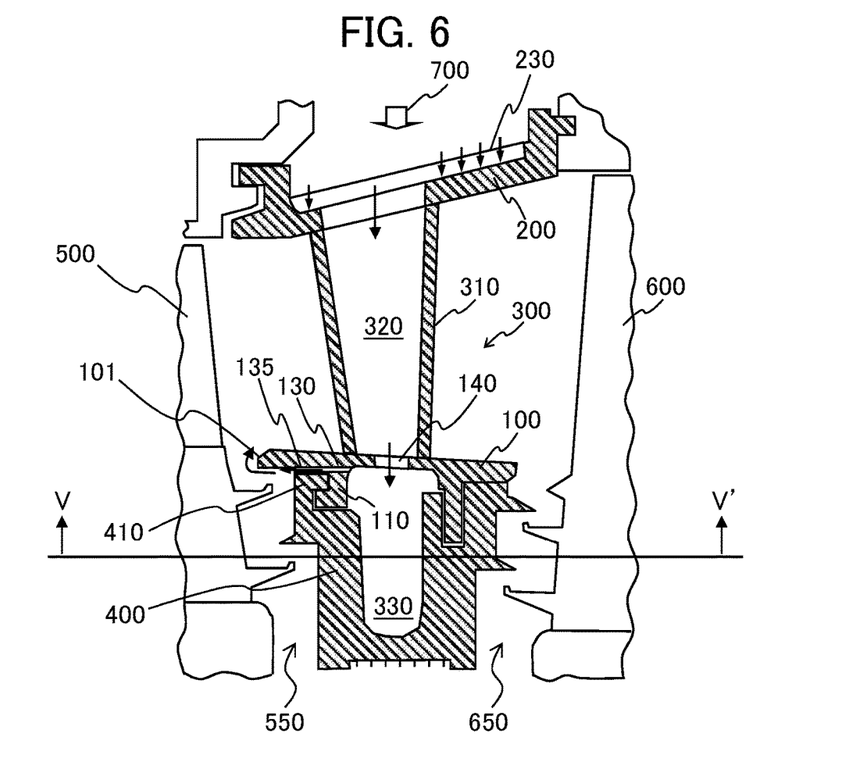
FIG. 6 is a cross-sectional view of the gas turbine airfoil 300 illustrated in FIG. 5 taken along plane B-B' in FIG. 5.

FIG. 5 is a top view of the inner band end wall portion 100 of a gas turbine airfoil (a second stage nozzle) 300 according to a second embodiment of the present invention by way of example. In addition, FIG. 5 illustrates the end wall portion 100 as viewed from the same direction (see arrows V, V' in FIG. 6) as in FIG. 1. Further, FIG. 5 illustrates an example of the arrangement of the cooling holes 130 of the hook portion 110 and the grooves 135 in the surface of the end wall. FIG. 6 is a cross-sectional view of a gas turbine airfoil 300 shown in FIG. 5 taken along plane B-B' in FIG. 5. In FIGS. 5 and 6, portions having the same functions as those having already been described in the previous embodiment are denoted with the same symbols as in the previous embodiment and their explanations are omitted.

In the present embodiment, as illustrated in FIG. 5, the cooling holes 130 disposed in the upstream side hook portion 110 are arranged at regular intervals in the circumferential direction of the turbine. The grooves are disposed on a surface (the inner circumferential surface), from which the upstream side hook portion 110 projects, in the surface of the inner band end wall portion 100. The groove 135 extends from the outlet portion 130b of the cooling hole 130 to the leading edge 101 of the inner band end wall portion 100 or to the vicinity thereof. In view of intending to strengthen the cooling function of the area 720 (see FIG. 4) corresponding to the high-temperature portion in the inner band end wall portion 100, the grooves 130 are provided only at the outlets 130b of the cooling holes 130 included in the area from point Pb to point Pm in FIG. 1.

As illustrated in FIG. 6, similarly to the previous embodiment, also the present embodiment is such that the upstream side hook portion 110 of the inner band end wall portion 100 is made to be engaged with the upstream side hook portion 410 of the diaphragm 400. In the case where the cooling holes 130 are disposed in the inner band end wall portion 100 as in the previous embodiment, therefore, if the gap 150 (see FIG. 3) between the inner circumferential surface of the inner band end wall portion 100 and the hook portion 410 is narrow, cooling air that is jetted out from the cooling holes 130 disposed in the upstream side hook portion 110 is difficult to flow toward the leading edge 101 in some cases.

To deal with this, the present embodiment is configured such that the grooves 135 are disposed in the inner circumferential surface of the inner band end wall portion 100 to enlarge the width of the cooling air passage. Thus, the amount of cooling air that is jetted from the outlets of the cooling holes 130 and passes through the gap 150 can be increased. As illustrated in FIG. 5, the grooves 135 are provided only on the outlet side of the cooling holes 130 located at the area that needs the cooling strengthening and that extends from the vicinity of the leading edge to pressure surface of the airfoil. With such a configuration, in addition to the convection cooling effect encountered when cooling air passes through the cooling holes 130 and the grooves 130, the flow rate of sealing air at the area mentioned above can be increased by use of the cooling air flowing out from the cooling holes 130. Thus, the cooling of the area 720 (see FIG. 4) exposed to high-temperature combustion gas can be strengthened. As a result, the flow rate of cooling air of the inner band end wall portion 100 can be distributed to a portion needing to be cooled. In addition, while the flow rate of cooling air is controlled, the thermal efficiency of the gas turbine can be improved.

The intervals of the cooling holes 130 arranged in the circumferential direction of the turbine are configured to be regular in the present embodiment. However, the arrangement intervals are different from each other as in the first embodiment to make a difference in the distribution of the flow rate clearer. This difference can also make it possible to achieve the cooling strengthening of the inner band end wall portion 100. The grooves 150 may be located at the corresponding outlets of all the cooling holes 130.

Third Embodiment

A third embodiment is such that the cooling holes 130 are not disposed in the upstream side hook portion 110 but cooling holes 131 are mainly disposed in the inner band end wall portion 100 to strengthen the cooling of appropriate portions.

Figure 7:
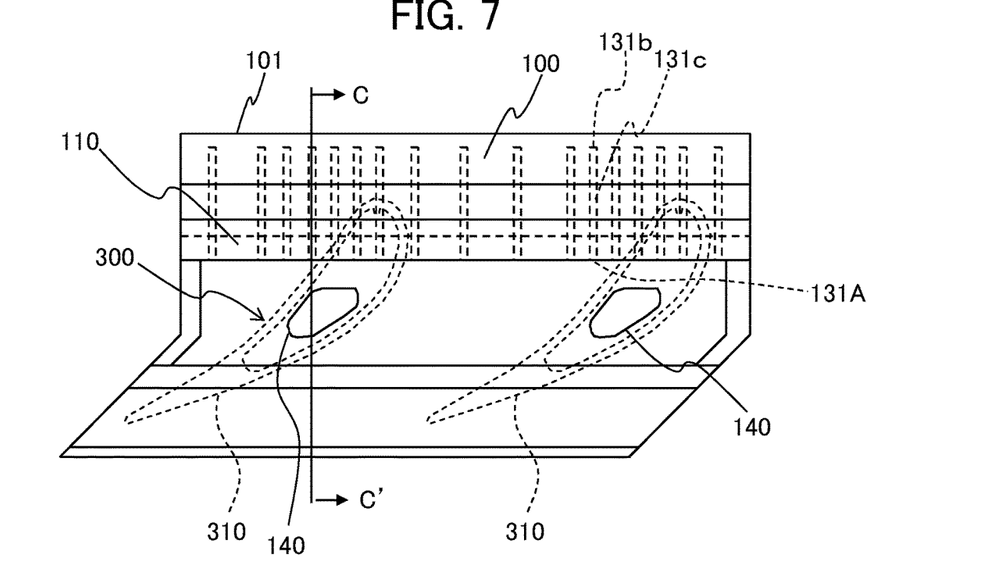
FIG. 7 is a top view of an inner band end wall portion 100 of a gas turbine airfoil 300 according to a third embodiment of the present invention by way of example.
Figure 8:
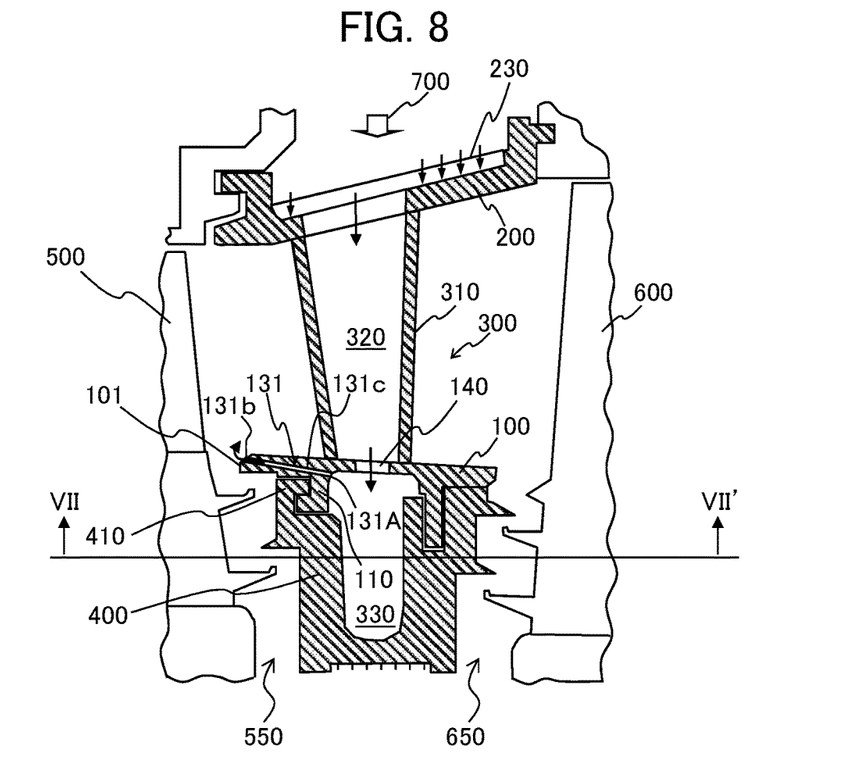
FIG. 8 is a cross-sectional view of the gas turbine airfoil 300 illustrated in FIG. 7 taken along plane C-C' in FIG. 7.

FIG. 7 is a top view of the inner band end wall portion 100 of a gas turbine airfoil (a second stage nozzle) 300 according to a third embodiment of the present invention by way of example. In addition, FIG. 5 illustrates the end wall portion 100 as viewed from the same direction (see arrows VII, VII' in FIG. 8) as in FIGS. 1 and 5. Further, FIG. 7 illustrates an example of the arrangement of the cooling holes 131. FIG. 8 is a cross-sectional view of the gas turbine airfoil 300 taken along plane C-C' in FIG. 7. In FIGS. 7 and 8, portions having the same functions as those having already been described in the previous embodiments are denoted with the same symbols as in the previous embodiments and their explanations are omitted.

With reference to FIG. 8, the cooling hole 131 in the present embodiment includes an inlet portion 131a, an outlet portion 131b, and an intermediate portion 131c. Specifically, the cooling hole 131 has the inlet portion 131a at the base of the upstream side hook portion 110. The cooling hole 131 is perforated in the inner band end wall portion 100 so as to extend from the inlet, pass through the inside thereof and open at the outlet portion 131b close to the leading edge 101. This configuration has a high cooling effect since cooling can be done from the inside of the inner band end wall portion 100 by use of the convection cooling effect of the cooling hole 130.

As illustrated in FIG. 7, the cooling holes 131 are arranged such that their intervals are narrowed in the circumferential direction of the turbine in an area 720 that needs the cooling strengthening and that extends from the vicinity of the leading edge to pressure surface of the airfoil similarly to the first embodiment. With such a configuration, similarly to the previous embodiments, the flow rate of sealing air in the area where the arrangement intervals are narrowed can be increased by use of the cooling air flowing out from the cooling holes 131. Further, cooling from the inside of the inner band end wall portion 100 can be strengthened. Thus, cooling of the area 720 exposed to high-temperature combustion gas can be strengthened effectively.

Incidentally, an increase in the flow rate of the sealing air in the inner band end wall portion 100 may be promoted by the use of the cooling holes 131. In such a case, it is preferable that the outlet portion 131b of the cooling hole 131 be provided close to the leading edge 101 on the outer circumferential surface of the inner band end wall portion 100 as the example shown in FIG. 8. In addition, the outlet portion 131b is preferably open toward the gas path of the gas turbine. With the provision of the outlet portion 131b as described above, the cooling air discharged from the cooling hole 131 rapidly flows on the outer circumferential surface of the end wall portion 100. Thus, the flow rate of sealing air in relation to the area 720 of a high-temperature portion can be increased easily.

The cooling hole 131 in the present embodiment is greater in length than that in the other embodiments, which leads to a tendency to raise a pressure loss therein. Therefore, a reduction in the amount of cooling air and the back-flow of combustion gas need to be taken account of more than in the other embodiments. However, as long as the present embodiment is applied with attentions to these points, the flow rate of the cooling air of the inner band end wall portion 100 can be distributed to appropriate portions. Thus, the flow rate of cooling air can be controlled to improve the thermal efficiency of the gas turbine.

Incidentally, in the example shown in FIG. 8, the inlet portion 131a of the cooling hole 131 is provided at the base of the upstream side hook portion 110. However, the inlet portion 131a may be provided at a portion other than the base of the upstream side hook portion 110 as long as it is provided on a surface facing the cooling passage 330. Further, the inlet portion 131a may be provided on the inner circumferential surface of the inner band end wall portion 100 as well.

The outlet portion 131b of the cooling hole 131 may be provided not only on the outer circumferential surface of the inner band end wall portion 100 shown in FIG. 8 but at other portions as long as they are located close to the leading edge 101 of the inner band end wall portion 100.

The above embodiments describe the examples in which the cooling holes 130, 131 and the grooves 135 are arranged along the whole circumference of the turbine although the arrangement intervals are different from each other. However, the sparseness and density of the arrangements of the cooling holes 130, 131 and the grooves 135 may be further clear depending on the degree of the necessity of cooling of the end wall portion 100. That is to say, the cooling holes 130, 131 and the grooves 135 may be arranged only at a portion in the circumferential direction of turbine. Each of the airfoils may adopt a configuration in which, for example, the cooling holes 130 are arranged only at the area from point Pb to point Pm in FIG. 1 and they are not arranged on the other areas.

The cross-section of each of the cooling holes 130, 131 illustrated in the above embodiments has a circle with a predetermined radius and its shape does not change in the long axis direction. However, the cross-sectional shape of each of the cooling holes 130, 131 can properly be modified if it is modified in such a range that a pressure difference between the outside and inside of the diaphragm can be ensured and cooling air passes through the cooling holes 130, 131 at such a speed and a flow rate as to exhibit an effect of cooling the inner band end wall portion 100. The same holds true for the axial length of the cooling holes 130, 131. In view of facilitating the machining of the cooling holes 130, 131 for the nozzle 300, the cooling holes 130, 131 are disposed in the upstream side hook portion 110 or the inner band end wall portion 100 to have a central axis parallel to the axial direction of the turbine in the illustrated examples. However, the cooling holes 130, 131 may be provided not only along such a direction but along other directions. These points hold true for the grooves 135.

The above embodiments describe the cooling of the inner band end wall portion 100 of the second stage nozzle in the gas turbine. However, the present invention can be applied to the inner band end wall of a nozzle of each of other stages. The present invention can be applied to portions that can adopt the same configuration as above, specifically, to an outer band end wall, the inner band and outer band end walls of a nozzle of a steam turbine, and the buckets of a gas turbine and of a steam turbine.

The present invention is not limited to the above embodiments and includes various modifications in a range not departing from the gist thereof. For example, the present invention is not limited to the gas turbine airfoil that includes all the configurations described in the above embodiments but includes also gas turbine airfoils in which a portion of such configurations is omitted. Alternatively, a portion of the configurations according to a certain one of the embodiments can be added to or replaced with a configuration according to another embodiment.

What is claimed is:

1. A gas turbine airfoil, comprising:
an airfoil portion having a cooling passage therein;
an end wall portion located on an end portion of one side of the airfoil portion in a radial direction of a gas turbine;
a leading edge side hook portion located on a leading edge side of the airfoil portion, the leading edge side hook portion being adapted to allow the end wall portion to be engaged with a diaphragm adjacent to the end wall portion; and
a plurality of cooling holes disposed in the leading edge side hook portion so as to be connected to the cooling passage, wherein the plurality of cooling holes are provided:
in a circumferential direction of the gas turbine;
at each of a first area and a second area in the circumferential direction of the gas turbine, the first area being located between a first point, at which a plane including a central axis of the gas turbine is in contact with a suction side of the airfoil portion, and a second point set at a predetermined position on the pressure surface of the airfoil portion, the second area being an area other than the first area in the circumferential direction of the gas turbine; and
in intervals, which are narrower in the first area than in the second area.

2. The gas turbine airfoil according to claim 1, wherein at the first area a flow rate of sealing air flowing on a surface of the airfoil portion side in the surface of the end wall portion is lower than the second area.

3. The gas turbine airfoil according to claim 1, wherein the second area is located between the second point and a position of the trailing edge of the airfoil portion in the circumferential direction of the gas turbine.

4. The gas turbine airfoil according to claim 1, wherein each of the plurality of cooling holes includes: an inlet portion provided in the leading edge side hook portion, the inlet portion opening on a surface facing toward the cooling passage and included in the leading edge side hook portion;

an outlet portion provided in the leading edge side hook portion, the outlet portion opening on a surface facing toward the diaphragm and included in the leading edge side hook portion; and an intermediate portion allowing the inlet portion and the outlet portion to communicate with each other.

5. The gas turbine airfoil according to claim 4, further comprising:
   a groove disposed on a surface projecting from the leading edge side hook and included in the end wall portion, the groove extending from any one of outlets of the plurality of cooling holes to the leading edge side of the end wall portion.

6. The gas turbine airfoil according to claim 1, wherein each of the plurality of cooling holes includes: an inlet portion provided in the leading edge side hook portion or the end wall portion, the inlet portion opening on a surface facing toward the cooling passage and included in the leading edge side hook portion or the end wall portion; an outlet portion provided in the end wall portion, the outlet portion opening on a leading edge side surface of the end wall portion; and an intermediate portion allowing the inlet portion and the outlet portion to communicate with each other.

7. The gas turbine airfoil according to claim 6, wherein the outlet portions of the plurality of cooling holes open into a gas path of the gas turbine.

8. A gas turbine comprising the gas turbine airfoil of claim 1.

* * * * *